2,916,436

BERYLLIA-BORIA COMPOSITION AS A CATALYST FOR CRACKING HIGHER BOILING HYDROCARBONS

Edward G. Baker, Berkeley Heights, N.J., assignor to Esso Research and Engineering Company, a corporation of Delaware No Drawing. Application June 19, 1957
Serial No. 666,775

22 Claims. (Cl. 208—114)

This invention relates to a composition of matter comprising beryllia and boria, to a method of preparing said composition of matter, and to methods of treating hydrocarbons, such as catalytic cracking, hydroforming, etc., using said composition of matter as a catalyst or contacting agent.

The utilization of catalytic or contact substances in the conversion of hydrocarbons has increased extensively in recent years. By employing such substances in the conversion of hydrocarbons it has been possible to produce improved hydrocarbon products which have found numerous applications. For example, such processes as catalytic cracking and hydroforming have made possible the manufacture of a high proportion of high octane gasoline from crude oil. The successful operation of these processes is in a large part dependent upon the particular catalyst employed in the process. Because of this there has been an intensive investigation of various substances in order to find suitable catalysts for processes of this type. Both natural materials, such as clays, and synthetic materials, such as silica-alumina, silica-magnesia, etc. have been employed in these processes. The suitability of a particular catalyst in catalytic cracking, for example, is determined by its ability to produce a relatively high yield of high octane gasoline and a relatively low yield of carbon and dry gas. Although the conventional natural and synthetic catalysts have been found to be generally acceptable in these hydrocarbon processes there is still considerable need for improvement of these catalytic substances in order to realize still further improved results.

It has now been found that a novel catalytic substance containing beryllia and boria more selectively catalyzes the conversions of hydrocarbons and is especially useful as a catalytic substance in the catalytic cracking of hydrocarbons because it produces more gasoline and less dry gas and carbon than commercial catalysts such as silica-alumina gels. In addition, the novel beryllia-boria catalyst exhibits unusually good heat stability. The beryllia-boria cracking catalyst of this invention contains about 30% to 50% by weight of beryllia and 70% to 50% by weight of boria, preferably about 40% by weight of beryllia and about 60% by weight of boria. It has also been found that the novel beryllia-boria catalyst may be combined with minor amounts of other metal compounds to produce a still further improved cracking catalyst or a catalyst suitable for utilization in such other hydrocarbon processes as desulfurization, hydroforming, etc. The beryllia-boria composition may also be employed as a base for the preparation of platinum or molybdenum hydroforming and hydrocracking catalysts.

In general, the beryllia-boria cracking catalyst is made by combining the hydrous oxide of beryllium with a compound of boron in desired proportions and drying and calcining the mixture to form an adsorbent gel. More specifically, the beryllia-boria cracking catalyst may be prepared by precipitating the hydrous oxide of beryllium from a beryllium salt solution, mixing the hydrous oxide of beryllium with a compound of boron and subsequently drying and calcining the mixture to form an adsorbent gel consisting essentially of beryllia and boria. The addition of the compound of boron to the hydrous oxide of beryllium may be accomplished by precipitating the hydrous oxide of beryllium in the presence of a water-soluble salt of boron, or by drying the hydrous oxide precipitate of beryllium and mixing the dried precipitate with a slurry of aqueous boric acid or powdered boric acid, or a hydrolyzable salt of boric acid. Minor amounts of other metals or compounds may be added to the beryllia-boria composition by base exchanging, impregnating or coprecipitating the beryllia-boria composition with an aqueous solution of the additional metal compounds.

It is an object of this invention to provide a process for the preparation of an improved catalytic substance comprising beryllia and boria.

It is a further object of this invention to provide an improved catalytic substance for utilization in hydrocarbon treating processes.

It is a still further object of this invention to provide a process for treating hydrocarbons in which a catalytic substance comprising beryllia and boria is utilized as a contacting agent.

More specifically the synthetic beryllia-boria catalyst may be prepared by several methods in accordance with this invention. In the preferred method, the hydrous oxide of beryllium is initially prepared by precipitating it from an aqueous or dilute acetic acid solution of a soluble beryllium salt, such as the carbonate or chloride, with ammonium hydroxide or other volatile base, such as a short chain quaternary ammonium hydroxide, hydroxylamine, etc., at a pH between about 8 and 10. A volatile base is preferred because it will not result in contamination of the catalyst. The precipitate of the hydrous oxide of beryllium is recovered from the solution by filtering and is then water washed and air dried. The dried hydrous beryllia, which contains about 5% solids and about 95% water, is then slurried with an aqueous solution of boric acid to impregnate it with boric acid and the mixture is then aged for about 10–20 hours to form a hydrogel. The hydrogel is dried at about 200–300° F. and then calcined at about 900–1100° F. for about 3–16 hours, after which the beryllia-boria catalyst is pulverized to the proper granular size for fluidized processes or formed into beads or pills for moving or fixed bed operations.

In another method of preparation, the air dried hydrous oxide of beryllium, prepared as in the previous method, is thoroughly mixed with a hydrolyzable ester or salt of boric acid and the mixture is allowed to age for about 10–20 hours. Thereafter the mixture is dried at about 200–300° F. and then calcined at about 900–1100° F. for about 3–16 hours.

In another method, the proper amount of boric acid or hydrolyzable borate is added initially to the beryllium salt solution from which the hydrous beryllium oxide is precipitated. In this method, therefore, a hydrous beryllia-boria composition is precipitated from the solution at a pH of about 8 to 10 by the addition of a volatile base. The hydrous beryllia-boria mixture is recovered from the solution by filtering. It is then washed, dried at about 200–300° F. and then calcined at about 900–1100° F. for about 3–16 hours.

In still another method of preparation, the hydrous oxide of beryllium, prepared as in the first-mentioned method, is dried at about 200–300° F. for about 10–20 hours. The resultant dried hydrous gel is then powdered by any well known means and is blended thoroughly with powdered boric acid or boria and the powdered mixture is heated at about 300–500° F. for at least 16 hours and then calcined at about 900–1100° F. for about 3–16 hours. Other modifications of these methods of preparation will be apparent to those skilled in the art after a reading of this specification. Specific procedures for preparing the beryllia-boria catalyst of this invention are illustrated in the following examples.

EXAMPLE 1

Hydrous BeO is prepared by dissolving 330 g. of $BeCO_3.4H_2O$ in 500 cc. of a 1:1 acetic acid-water solution. This solution is diluted with 1 liter of water and heated to 60–70° C. to insure complete solution of the $BeCO_3.4H_2O$. An ammonium hydroxide solution, made by diluting a 30% $NH_3$ solution with an equal volume of water, is added slowly to the $BeCO_3.4H_2O$ solution, with constant stirring, to obtain a pH of about 10. The resultant precipitated hydrous BeO is filtered, washed several times with water, and air dried on a filter press. The air-dried hydrous oxide contains about 5% BeO and about 95% water.

Then 1600 g. of the hydrous BeO, prepared as described above, is slurried with a hot solution of 213 g. of orthoboracic acid ($H_3BO_3$) in 1500 cc. of water which has been heated to about 60–70° C. After the mixture is allowed to age about 16 hours, the entire system sets to a vibrant gel. The gel is pressed to remove syneresis water, dried slowly at 250° F. and broken up into pieces and activated at 1000° F. for 16 hours. The final catalytic substance contains about 40% by weight of BeO and 60% by weight of $B_2O_3$.

The hydrous BeO, described above, may be prepared from $BeCl_2$, or from other solutions of water soluble or acetic acid soluble beryllium salts.

The fresh 40% BeO—60% $B_2O_3$ catalyst, prepared as above, has a surface area of 346 m.$^2$/g. After this catalyst was subjected to 3 air-nitrogen regenerations at 1100° F. (after being used to crack gas oil for a total period of 5 hours), the used catalyst had a surface area of 341 m.$^2$/g. This same used catalyst, after being heated at 1200° F. for 16 hours, had a surface area of 308 m.$^2$/g. Hence it will be seen that even after heating the catalyst between about 950° F. and about 1200° F. for about 25 hours, the catalyst still had a surface area greater than 300 m.$^2$/g. The catalyst has, therefore, good heat stability, and does not sinter appreciably at temperatures below about 1200° F.

To demonstrate the superiority of the beryllia-boria catalyst prepared in this example over a commercial cracking catalyst which comprised 88% silica and 12% alumina, each of these catalysts was employed as small pills to catalytically crack East Texas Light Gas Oil. The cracking operation was carried out in a 200 cc. fixed bed reactor at atmospheric pressure and the following results were obtained:

*Table I*

| | Commercial Catalyst | Catalyst of Present Invention |
|---|---|---|
| Catalyst | 88% Silica—12% Alumina. | 40% Beryllia—60% Boria. |
| Temp. °F | 950 | 950. |
| W./Hr./W.[1] | 0.79 | 0.89. |
| Cycle Length, Hrs. | 1 | 2. |
| 430° F. Conv., Wt. Percent | 60 | 60. |
| Yields, Wt. Percent: | | |
| $C_5$–430° F. gasoline | 30.6 | 33.6. |
| Carbon | 8.3 | 4.6. |
| Dry Gas | 10.8 | 8.3. |
| $C_4$'s | 9.3 | 13.5. |

[1] Weight of gas oil/hour/weight of catalyst in reactor.

It will be noted that the beryllia-boria catalyst prepared in accordance with the present invention demonstrated improved selectivity over the commercial silica-alumina cracking catalyst. Specifically, an increased yield of $C_5$—430° F. gasoline of 3% will be noted. In addition, considerably less carbon and dry gas were formed when cracking the East Texas Light Gas Oil with the beryllia-boria catalyst of the present invention than when cracking the same gas oil with the commercial silica-alumina cracking catalyst. It is, of course, desirable to minimize the amount of carbon and dry gas and to maximize the volume of gasoline produced in the catalytic cracking of hydrocarbons. It will be further noted that the yield of $C_4$'s was also improved when employing the beryllia-boria catalyst.

EXAMPLE 2

In this example, 1600 g. of hydrous BeO (containing 5% solids) prepared as in Example 1 is mixed with 358 g. of trimethyl borate. The mixture is thoroughly blended and allowed to age for 16 hours. The aged mixture is then dried slowly at 250° F. and activated at 1000° F. for 16 hours. The final catalytic substance contains 40% BeO and 60% $B_2O_3$.

EXAMPLE 3

In this example, 358 g. of methyl borate are added to a solution of 255 g. of $BeCl_2$ in 2 liters of water. A diluted ammonia solution, prepared by diluting a 30% $NH_3$ solution with an equal volume of water, is added slowly to the salt solution of beryllium and boron, with constant stirring to a pH of about 10. The resultant precipitated hydrous BeO—$B_2O_3$ composition is filtered, washed to remove chloride ions and dried slowly at 250° F., after which the dried precipitate or gel is activated at 1000° F. for 16 hours. The final catalytic substance contains 40% BeO and 60% $B_2O_3$.

EXAMPLE 4

In this example, 1600 g. of hydrous BeO containing about 5% solids which is prepared as in Example 1 is dried at 250° F. for 16 hours. The dried gel is powdered by ball milling and blended thoroughly with 213 g. of powdered orthoboracic acid. Preferably, the powdered substances have a size range of about 20–80 microns. The mixed powders are calcined at 1000° F. for 16 hours, after being heated together at 400° F. for at least 16 hours. The final catalytic substance contains 40% BeO and 60% $B_2O_3$.

The product selectivity of the beryllia-boria cracking catalyst may be improved by the addition of minor proportions of other metals. For example, the beryllia-boria catalyst prepared by the methods previously described may be combined with group II alkaline earth metals by electrolytic base exchange to produce an improved cracking catalyst. More specifically, the dried beryllia-boria catalyst which has been activated by heating to about 900–1100° F. for 3–16 hours may be combined with such metals as calcium, magnesium, zinc or additional beryllium by adding the calcined beryllia-boria catalyst to dilute solutions of the decomposable salts of these metals such as acetates or nitrates. The beryllia-boria catalyst is allowed to remain in the solution for about 10–20 hours. The catalyst is then filtered from the solution, dried and calcined at about 900–1100° F. for about 3–16 hours. Also highly selective catalysts are formed when electrolytic exchange media comprising saturated solutions of the less soluble carbonates or hydroxides of the above-mentioned metals are employed in the same manner. These improved catalysts prepared by electrolytic base exchange contain about 0.04 to 1.5% of calcium, magnesium, zinc or additional beryllium oxide.

With certain hydrocarbon feed stocks, performance of the beryllia-boria cracking catalyst is improved by the addition of a small amount of HF, $BF_3$, $H_3PO_4$, etc. during the preparation or use of the catalyst. Thus, for example, a small amount of these compounds may be added to the hydrous oxide of beryllium during the preparation of the beryllia-boria catalyst. However, the addition of HF especially improves the performance of used or regenerated catalysts. For example, used cracking catalyst may be withdrawn from the regenerator of a catalytic cracking system and moistened with about a 4% aqueous solution of HF. The HF treated catalyst is then dried at about 200–300° F., activated at about 900–1100° F. and returned to the catalytic cracking reactor. The used catalyst may also be treated in situ by passing a NH$_4$F-steam mixture over the catalyst.

The beryllia-boria composition prepared in accordance with the present invention may also be employed as a base for the preparation of hydroforming catalysts. Thus, about 0.2 to 6 wt. percent platinum may be incorporated into the beryllia-boria composition. In one method, a good hydroforming catalyst may be prepared by impregnating spent beryllia-boria catalyst, which has become deactivated or desurfaced in the catalytic cracking of hydrocarbons, with a solution of a platinum compound followed by drying and calcining at about 900–1100° F.

A suitable method for preparing beryllia-boria catalysts containing a small amount of a promoter is illustrated in the following example:

EXAMPLE 5

The cracking performance of the BeO—B$_2$O$_3$ composition may be improved by the following procedure. In this example, 200 g. of a beryllia-boria composition that has been heated at 1000° F. for 16 hours as in Example 1, is contacted for 2 hours, with constant stirring, with one liter of a saturated solution of basic magnesium carbonate containing 1.3 g. of the salt/liter of water. The system is allowed to stand for 16 hours, after which the catalyst is filtered, air-dried at 250° F. for 16 hours and activated at 1000° F. for 16 hours. The final catalytic substance contains 40% BeO, 60% B$_2$O$_3$ and 0.10% MgO.

For catalytic cracking the feed stock is preferably a virgin gas oil when cracking for gasoline, but other feed stocks such as reduced crude, gas oil from a coking operation, visbroken residua, heavy naphtha, etc. may be used. The temperature during catalytic cracking is preferably between about 850° F. and 1100° F. and the pressure during cracking is between about atmospheric and 100 p.s.i.g. The regeneration of the coked catalyst is carried out between about 900° F. and about 1200° F. The catalyst may be in the form of pills or cylinders for fixed bed or moving bed catalytic cracking or it may be in the form of a powder mostly through 100 standard mesh so that the particles have a size between about 0–150 microns with most of the particles being between about 20 and 80 microns.

In the preparation of the beryllia-boria catalyst of the present invention, the hydrous mixture containing beryllia and boria is dried at a temperature between about 200° F. and 300° F. for about 3 to 20 hours and then calcined or activated at a temperature between about 900° F. and 1100° F. for between about 3 and 16 hours.

This application is filed as a continuation-in-part of Baker Application Serial No. 416,955, filed March 17, 1954, now abandoned.

What is claimed is:

1. A method of preparing a composition containing about 30–50% beryllia and the remainder boria which comprises precipitating hydrous beryllia from a solution containing beryllium ions, mixing the hydrous beryllia with boric acid, aging the mixture for at least 10 hours and drying the aged mixture, and calcining the dried mixture at about 900–1100° F. for at least about 3 hours.

2. The method of claim 1 in which the hydrous beryllia is mixed with a compound of boric acid which hydrolyzes to form boric acid.

3. A method of preparing a composition containing at least about 30% beryllia and the remainder boria which comprises precipitating a mixture of hydrous beryllia-boria from a solution containing beryllium and boron ions at a pH of at least about 8, drying the mixture, and calcining the dried mixture at about 900–1100° F. for at least about 3 hours.

4. A method of preparing a catalyst containing about 30–50% beryllia and the remainder boria which comprises precipitating hydrous beryllia from an aqueous solution containing beryllium ions at a pH of between about 8 and 10 by the addition of a volatile base, mixing the hydrous beryllia with an aqueous solution of boric acid, aging the mixture for about 10–20 hours to form a gel, drying the aged mixture, and calcining the dried mixture at about 900–1100° F. for about 3 to 16 hours.

5. A method of preparing a catalytic substance containing about 30–50% beryllia and the remainder boria which comprises precipitating a mixture of hydrous beryllia and boria from a solution containing beryllium and boron ions at a pH between about 8 and 10, drying the mixture, and calcining the dried mixture between about 900° F. and about 1100° F. for at least about 3 hours.

6. A method of catalytically cracking higher boiling hydrocarbons to produce lower boiling hydrocarbons which comprises contacting higher boiling hydrocarbons with a catalyst containing about 30–50% beryllia and the remainder boria and made by precipitating a mixture of hydrous beryllia and boria from a solution containing beryllium and boron ions at a pH between about 8 and 10, recovering the precipitate and drying it and then calcining the dried precipitate between about 900° F. and about 1100° F. for at least about 3 hours.

7. A method of catalytically cracking higher boiling hydrocarbons to produce gasoline which comprises contacting higher boiling hydrocarbons under cracking conditions of temperature and pressure with a mass of catalyst particles containing about 40% beryllia and about 60% boria.

8. A method according to claim 7 wherein the higher boiling hydrocarbons comprise gas oil and the temperature of cracking is between about 850° F. and about 1100° F.

9. A method of treating hydrocarbons to produce gasoline which comprises contacting the hydrocarbons under conversion conditions of temperature and pressure with discrete catalyst particles consisting essentially of beryllia and boria and containing at least about 50% by weight of boria.

10. A heat stable adsorbent and catalytic composition in discrete and particulate form consisting essentially of beryllia and boria and having a surface area above about 300 m.$^2$/g. after having been heated between about 950° F. and 1200° F. for at least about 25 hours.

11. A composition as defined in claim 10 which consists of 40% by weight of beryllia and 60% by weight of boria.

12. A composition of matter in discrete and particulate form consisting essentially of about 30–50% beryllia and the rest boria.

13. An adsorbent and porous catalytic composition in discrete and particulate form containing about 30–50% beryllia and about 70–50% boria.

14. An adsorbent and porous catalytic composition in discrete and particulate form consisting essentially of about 40% beryllia and about 60% boria.

15. A composition as defined in claim 14 which has been calcined at a temperature between about 900° F. and 1100° F. for at least 3 hours.

16. As a new product, discrete particles of a porous adsorbent material comprising a calcined mixture containing about 40% beryllia and about 60% boria.

17. A calcined adsorbent and porous composition in discrete atnd particulate form and adapted for use in treating hydrocarbons consisting essentially of about 40% beryllia and about 60% boria.

18. As a new product, discrete calcined particles of a porous adsorbent material containing 30–50% beryllia and at least about 50% by weight of boria.

19. A new catalyst adapted for cracking hydrocarbons consisting essentially of beryllia and boria which comprises discrete particles previously calcined at a temperature between about 900° F. and 1100° F. for at least 3 hours and having a surface area greater than about 300 m.²/g.

20. A catalyst as defined in claim 19 which is heat stable and retains a large surface area on repeated heatings above 1000° F. and which consists essentially of about 40% beryllia and 60% boria.

21. A method for catalytic cracking of higher boiling hydrocarbons to produce gasoline which comprises contacting higher boiling hydrocarbons under cracking conditions of temperature and pressure with a catalyst containing about 30–50% beryllia and the rest boria.

22. A method according to claim 21 wherein the higher boiling hydrocarbon comprises gas oil and the temperature of cracking is about 950° F.

References Cited in the file of this patent

UNITED STATES PATENTS 2,129,649    Cross et al. _____ Sept. 13, 1938